(12) United States Patent
Smallwood et al.

(10) Patent No.: US 12,442,302 B2
(45) Date of Patent: *Oct. 14, 2025

(54) SOLID-STATE WELDED MULTI-PIECE RADIAL TURBINE WITH AIR COOLED BLADES FOR GAS TURBINE ENGINES

(71) Applicant: Rolls-Royce North American Technologies Inc., Indianapolis, IN (US)

(72) Inventors: Michel S. Smallwood, Indianapolis, IN (US); Stanford Clemens, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/000,957

(22) Filed: Dec. 24, 2024

(65) Prior Publication Data

US 2025/0154870 A1 May 15, 2025

Related U.S. Application Data

(63) Continuation of application No. 18/371,851, filed on Sep. 22, 2023, now Pat. No. 12,215,595.

(51) Int. Cl.
| | | |
|---|---|---|
| *F01D 5/04* | (2006.01) | |
| *B23P 15/00* | (2006.01) | |
| *F01D 5/02* | (2006.01) | |
| *F01D 5/08* | (2006.01) | |
| *F01D 5/30* | (2006.01) | |

(52) U.S. Cl.
CPC .............. *F01D 5/04* (2013.01); *B23P 15/006* (2013.01); *F01D 5/021* (2013.01); *F01D 5/048* (2013.01); *F01D 5/085* (2013.01); *F01D 5/3023* (2013.01); *Y10T 29/4932* (2015.01); *Y10T 29/49321* (2015.01); *Y10T 29/49329* (2015.01)

(58) Field of Classification Search
CPC . F01D 5/04; F01D 5/021; F01D 5/085; F01D 5/3023; F01D 5/043; F01D 5/048
See application file for complete search history.

(56) References Cited

U.S. PATENT DOCUMENTS

| | | | |
|---|---|---|---|
| 4,529,452 | A | 7/1985 | Walker |
| 4,628,008 | A | 12/1986 | Conolly |
| 4,850,802 | A | 7/1989 | Pankratz |
| 6,666,653 | B1 | 12/2003 | Carrier |
| 6,969,238 | B2 | 11/2005 | Groh |

(Continued)

*Primary Examiner* — Sarang Afzali
(74) *Attorney, Agent, or Firm* — Barnes & Thornburg

(57) ABSTRACT

A multi-piece radial turbine rotor includes a hub, a plurality of turbine blades, and a flowpath ring that couples the turbine blades to the hub. The flowpath ring is coupled with each of the plurality of turbine blades and the hub to locate the flowpath ring radially between the hub and each of the plurality of turbine blades. The flowpath ring is formed to include a plurality of apertures spaced apart from one another about the flowpath ring and extending radially through the flowpath ring. Each of the plurality of apertures receives a corresponding one of the plurality of turbine blades therein. The hub is fixed to the flowpath ring by a friction weld joint and each of the plurality of turbine blades is fixed to the flowpath ring by a blade joint.

20 Claims, 8 Drawing Sheets

(56) References Cited

U.S. PATENT DOCUMENTS

| | | |
|---|---|---|
| 7,784,182 B2 | 8/2010 | Carrier |
| 8,242,406 B2 | 8/2012 | Schreiber |
| 8,662,851 B2 | 3/2014 | Izadi |
| 9,476,305 B2 | 10/2016 | Jan |
| 9,726,022 B2 | 8/2017 | Mittendorf |
| 9,850,760 B2 | 12/2017 | Crosatti |
| 10,280,768 B2 | 5/2019 | Freeman |
| 11,506,060 B1 | 11/2022 | Kurlak |
| 2008/0000558 A1* | 1/2008 | Yang .................. C22F 1/183 |
| | | 148/527 |
| 2013/0272882 A1 | 10/2013 | Mittendorf |
| 2013/0280036 A1 | 10/2013 | Jan |
| 2016/0305249 A1 | 10/2016 | Crosatti |
| 2017/0254209 A1 | 9/2017 | Smoke |
| 2018/0128109 A1 | 5/2018 | Humes |

* cited by examiner

SOLID-STATE WELDED MULTI-PIECE RADIAL TURBINE WITH AIR COOLED BLADES FOR GAS TURBINE ENGINES

CROSS REFERENCE TO RELATED APPLICATIONS

This application claims priority to and the benefit of U.S. Non-Provisional patent application Ser. No. 18/371,851, filed Sep. 22, 2023 and issued as U.S. Pat. No. 12,215,595, the disclosure of which is now expressly incorporated herein by reference.

FIELD OF THE DISCLOSURE

The present disclosure relates generally to radial turbines, and more specifically to radial turbine rotors.

BACKGROUND

Radial turbine rotors are characterized by rotating in response to a flow of working fluid radially inwardly toward the axis of rotation. In many applications, radial turbine rotors can be more efficient than axial turbine rotors that rotate in response to a flow of working fluid primarily parallel to the axis of rotation.

To increase efficiency of radial turbine rotors, it can be beneficial to increase the temperature of the working fluid that interacts with the rotors. However, manufacturing radial turbine rotors from high temperature materials and/or incorporating an active supply of cooling air into radial turbines presents challenges.

SUMMARY

The present disclosure may comprise one or more of the following features and combinations thereof in an effort to address challenges in radial turbine rotor design and manufacture.

A method of assembling a radial turbine rotor may comprise manufacturing a plurality of turbine blades. Each of the plurality of turbine blades may be shaped to include a root portion and an airfoil portion radially outward of the root portion. The method may comprise manufacturing a flowpath ring that extends around a central axis. The flowpath ring may be configured to be coupled with each of the plurality of turbine blades.

In some embodiments, the method may comprise manufacturing a hub that extends around the central axis. The method may comprise fixing each of the plurality of turbine blades circumferentially around the flowpath ring by a blade joint between each of the plurality of turbine blades and the flowpath ring to form a ring assembly. The method may comprise spinning the hub about the central axis.

In some embodiments, the method may comprise axially moving the hub into engagement with the flowpath ring to locate the hub radially inwardly of the flowpath ring and to form a hub joint between the flowpath ring and the hub. The blade joint may be a braze joint. The hub joint may be a friction weld joint. The friction weld joint may be an inertia weld joint. The inertia weld joint may be formed between a radially-outwardly facing surface of the hub and a radially-inwardly facing surface of the flowpath ring.

In some embodiments, the friction weld joint may be a linear friction weld joint, and the linear friction weld joint may be formed between a radially-outwardly facing surface of the hub and a radially-inwardly facing surface of the flowpath ring. The method may comprise inspecting the plurality of turbine blades, the flowpath ring, and the hub for defects before the step of fixing each of the plurality of turbine blades to the flowpath ring. The method may comprise inspecting the blade joints for defects before the step of spinning the hub about the central axis. The method may comprise inspecting the hub joint for defects.

In some embodiments, the method may comprise, after the step of fixing each of the plurality of turbine blades to the flowpath ring, attaching the ring assembly to a mount tool to maintain a stationary position of the ring assembly. The method may comprise machining a radially-inwardly facing surface of the ring assembly and machining a radially-outwardly facing surface of the hub to form matching conical surfaces. The flowpath ring may be a full hoop. The flowpath ring may be segmented.

A radial turbine rotor may comprise a hub, a plurality of turbine blades, and a flowpath ring. The hub may be arranged around a central axis that defines a radially-innermost surface of the rotor. The plurality of turbine blades may be located circumferentially outward of the hub. The flowpath ring may be configured to be coupled with each of the plurality of turbine blades and the hub to locate the flowpath ring radially between the hub and each of the plurality of turbine blades. The hub may be fixed to the flowpath ring by a friction weld joint formed between a radially-outwardly facing surface of the hub and a radially-inwardly facing surface of the flowpath ring.

In some embodiments, the friction weld joint may be an inertia weld joint. Each of the plurality of turbine blades may be fixed to the flowpath ring by a blade joint formed between each of the plurality of turbine blades and the flowpath ring. The blade joint may be a braze joint. The flowpath ring may be a full hoop. The friction weld joint may be a linear friction weld joint. The flowpath ring may be segmented. The radially-inwardly facing surface of the flowpath ring and the radially-outwardly facing surface of the hub may be matching conical surfaces.

These and other features of the present disclosure will become more apparent from the following description of the illustrative embodiments.

DETAILED DESCRIPTION OF THE DRAWINGS

Figure 1:
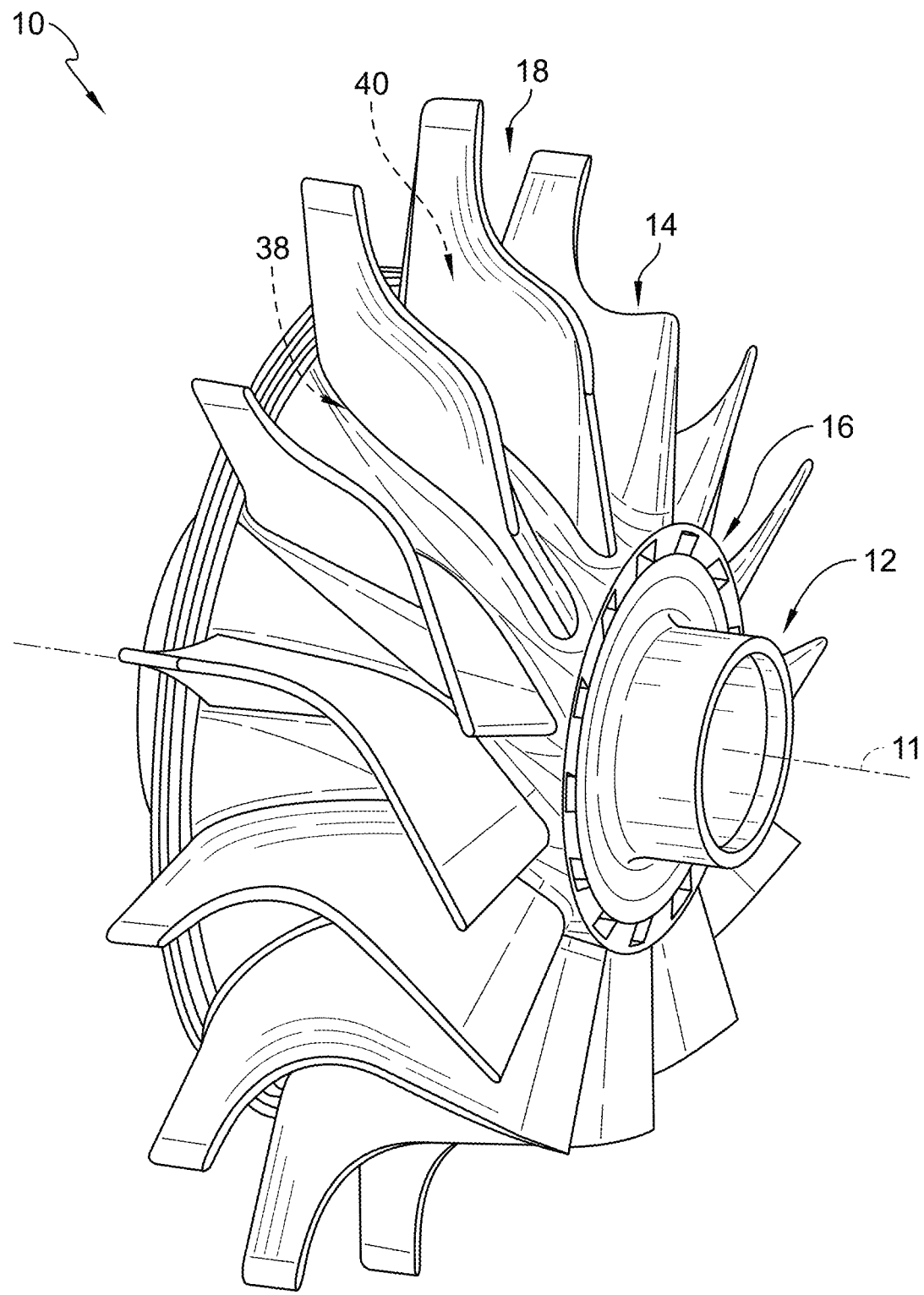
FIG. 1 is a perspective view of a radial turbine rotor assembled from a number of different pieces.

For the purposes of promoting an understanding of the principles of the disclosure, reference will now be made to a number of illustrative embodiments illustrated in the drawings and specific language will be used to describe the same.

A radial turbine rotor 10 for use in a gas turbine engine includes a hub 12, a plurality of turbine blades 14, and a flowpath ring 16 as shown in FIG. 1. The radial turbine rotor 10 extracts energy from a working fluid, such as hot, high pressure combustion products, flowing through a gas path 18. The radial turbine rotor 10 rotates about a central axis 11 to extract mechanical work from the flow of working fluid to drive other components of the gas turbine engine. The flow of working fluid in the radial turbine rotor 10 may be radial to the central axis 11.

Temperatures of the working fluid at an inlet of radial turbines may be relatively high. To allow for relatively high temperatures of the working fluid, cooling of radial turbines—like the rotor 10 described herein—may be useful so that the materials of the radial turbine can withstand the relatively high temperatures. Conventional manufacturing methods for integrally-cooled turbines utilize integrally cast turbine blades and hub. However, these conventional manufacturing methods may not be cost effective for radial turbines. For example, if one turbine blade of the integrally cast radial turbine has a defect, the entire radial turbine may be unusable. A low casting yield in production due to potential defects may lead to increased costs.

Figure 2:
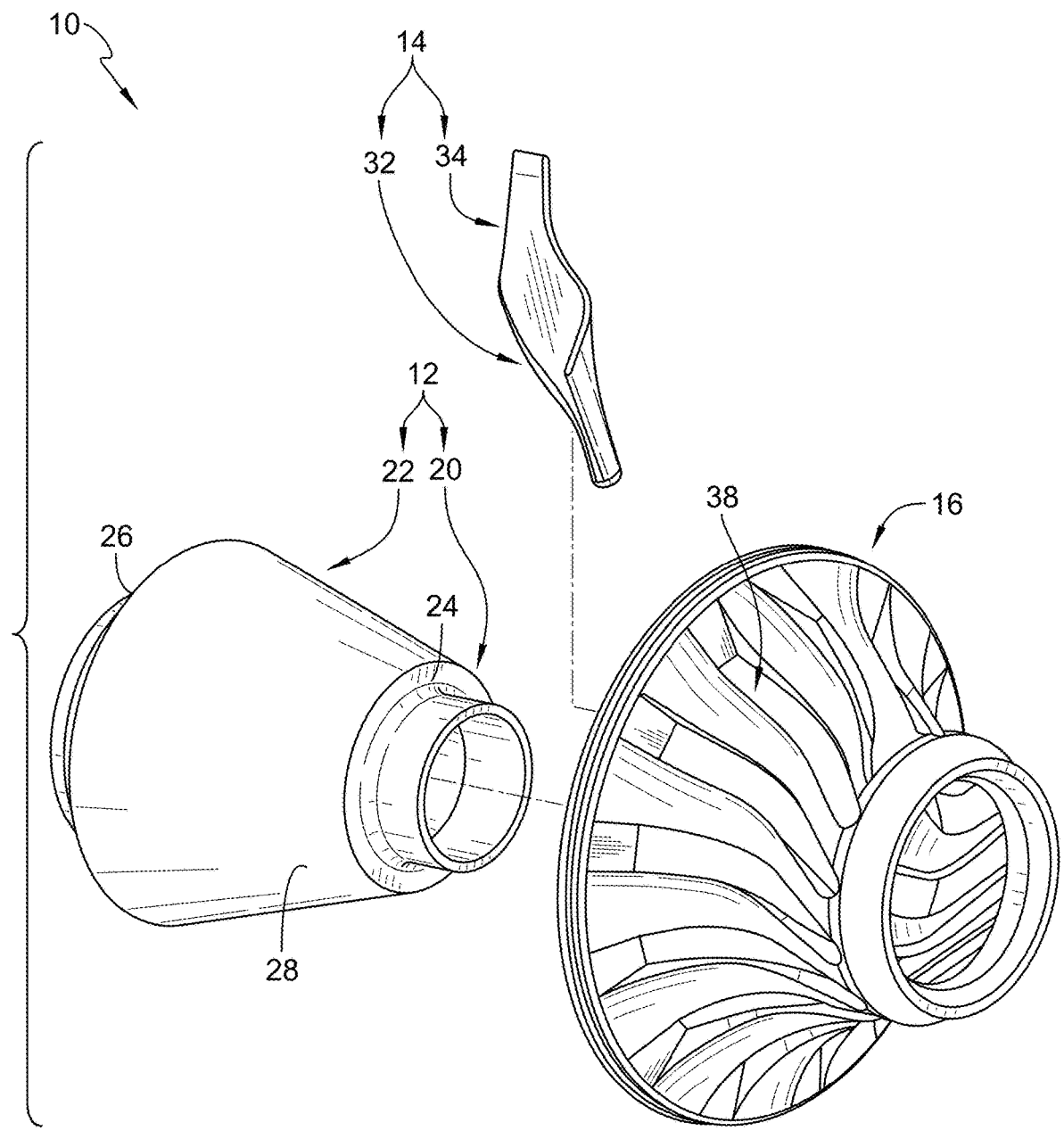
FIG. 2 is an exploded perspective assembly view of the radial turbine rotor from FIG. 1 showing that the rotor includes a hub, a turbine blade, and a flowpath ring formed to include apertures sized to receive a root portion of the turbine blade while an airfoil portion of the turbine blade extends radially outwardly from the flowpath ring, and the flowpath ring shaped to receive the hub inward of the turbine blade to block removal of the turbine blade when the flowpath ring is bonded to the hub.

The radial turbine rotor 10 includes the hub 12, the plurality of turbine blades 14, and the flowpath ring 16, which are separate components that are assembled to form the radial turbine rotor 10 as suggested in FIG. 2. The multi-piece radial turbine rotor 10 allows for inspection of each component prior to assembly of the radial turbine rotor 10 so that the entire radial turbine rotor 10 may not be deemed unusable due to a defect in one component. Each component (i.e., the hub 12, each of the plurality of turbine blades 14, and the flowpath ring 16) may be inspected for defects prior to coupling the components together, and defective components may be discarded.

Figure 3:
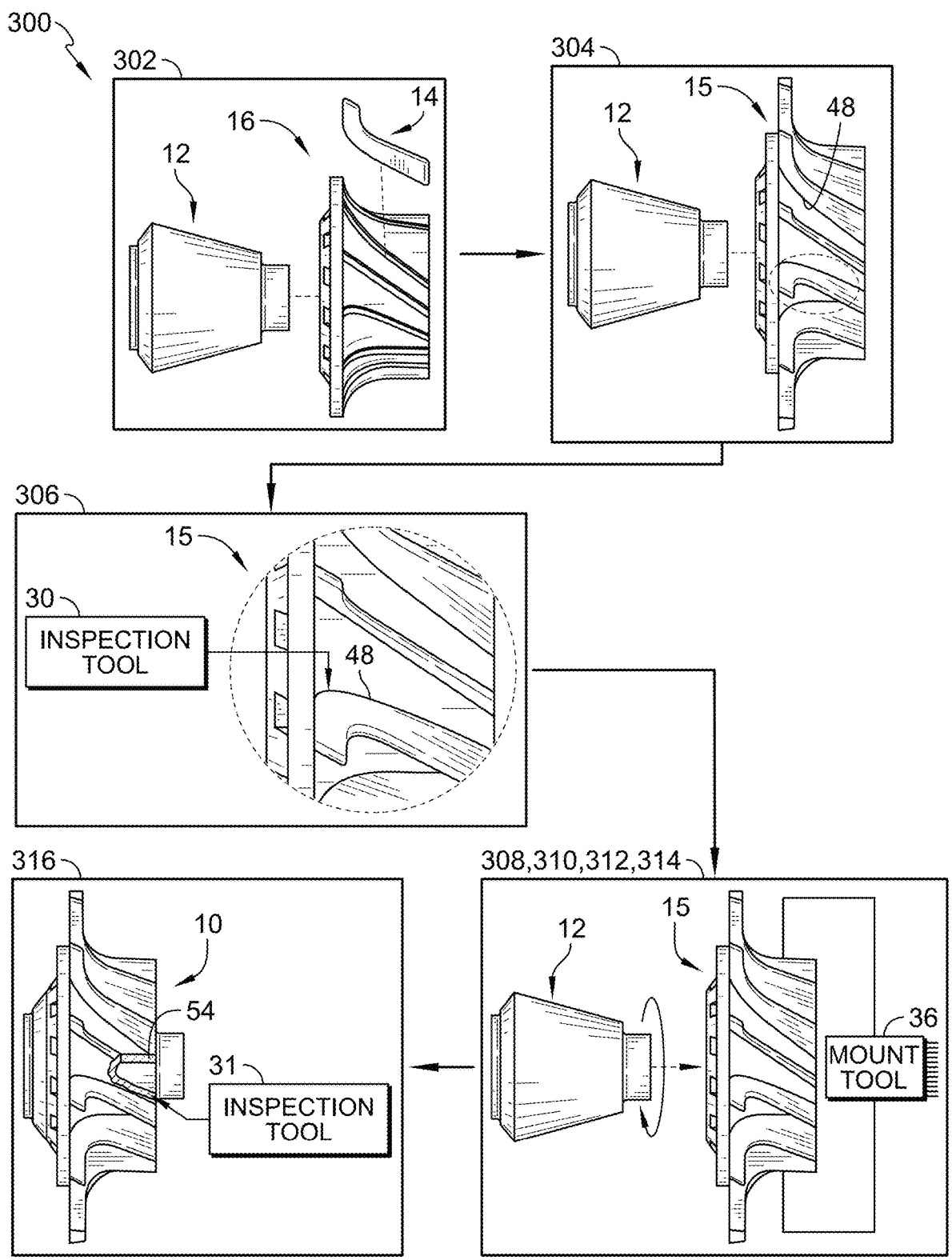
FIG. 3 is a diagrammatic view of a radial turbine rotor assembly process showing that the radial turbine rotor assembly process includes (i) manufacturing the hub, the turbine blade, and the flowpath ring, (ii) bonding the turbine blade with the flowpath ring to form a ring assembly, (iii) inspecting a blade joint between the turbine blade and the flowpath ring, (iv) attaching the ring assembly to a mount tool, rotating the hub, and axially moving the hub into engagement with the ring assembly to form the radial turbine rotor, and (v) inspecting a friction weld joint between the hub and the ring assembly.
Figure 4:
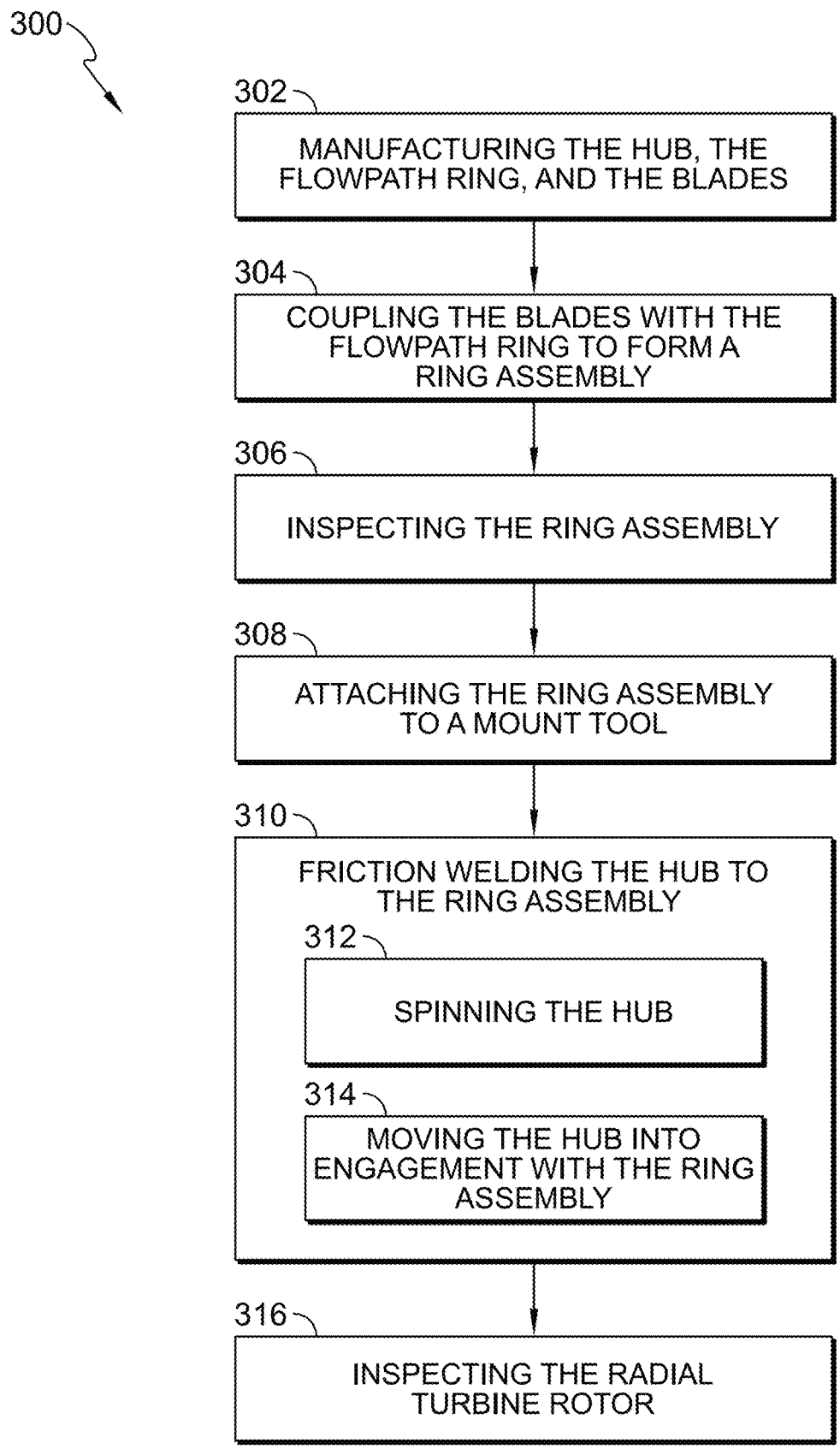
FIG. 4 is a method for assembling the radial turbine rotor of FIG. 1, similar to the process shown in FIG. 3.

A radial turbine rotor assembly process 300 for assembling the radial turbine rotor 10 is shown in FIGS. 3 and 4. In step 302, the hub 12, the plurality of turbine blades 14, and the flowpath ring 16 are separately manufactured. The hub 12 is integrally formed as a single component. The flowpath ring 16 is integrally formed as a single component. Each component is inspected for defects. Components including a defect may be discarded such that the component is not used in the process 300.

In the illustrative embodiment, the hub 12 includes a cylindrical portion 20 and a conical portion 22 as shown in FIG. 2. The conical portion 22 of the hub 12 extends between a first end 24 and a second end 26. The first end 24 has a first diameter, and the second end 26 has a second diameter. The first diameter is smaller than the second diameter. The first end 24 of the conical portion 22 is coupled with the cylindrical portion 20 of the hub 12.

Each of the plurality of turbine blades 14 is coupled with the flowpath ring 16 in step 304 to form a ring assembly 15 as shown in FIGS. 3 and 4. The plurality of turbine blades 14 are circumferentially spaced apart from one another about the central axis 11. Each of the plurality of turbine blades 14 includes a root portion 32 and an airfoil portion 34 extending radially outwardly from the root portion 32.

In some embodiments, the flowpath ring 16 is formed to include at least one aperture 38 extending radially through the flowpath ring 16 as shown in FIG. 2. In such an embodiment, the flowpath ring 16 may be formed to include a plurality of apertures 38. Each aperture 38 is sized to receive a corresponding root portion 32 of the turbine blade 14.

Each turbine blade 14 is inserted by moving the airfoil portion 34 of the turbine blade 14 through the corresponding aperture 38 (e.g., by locating the turbine blade 14 radially inward of the flowpath ring 16 and moving the turbine blade 14 radially outward through the aperture 38). After insertion of the turbine blade 14 into the aperture 38, the airfoil portion 34 is located radially outward of the flowpath ring 16, and the root portion 32 is located within the aperture 38. The aperture 38 is sized to block radially outward movement of the turbine blade 14 all the way through the aperture 38.

In some embodiments, the flowpath ring 16 is formed without apertures. In such an embodiment, the root portion 32 of each of the plurality of turbine blades 14 is coupled to a radially-outwardly facing surface of the flowpath ring 16.

In step 304, each turbine blade 14 is fixed to the flowpath ring 16 by a blade joint 48 between the root portion 32 of the turbine blade 14 and the flowpath ring 16 to form the ring assembly 15 as shown in FIG. 3. In some embodiments, the blade joint 48 is a braze joint. In some embodiments, the blade joint 48 is a diffusion bond joint. In some embodiments, the blade joint 48 is a friction weld joint. In some embodiments, the blade joint 48 may be any other joint that fixes the root portion 32 of the turbine blade 14 with the flowpath ring 16.

The ring assembly 15 is inspected in step 306 to determine if the blade joint 48 has been sufficiently formed between each turbine blade 14 and the flowpath ring 16 as shown in FIGS. 3 and 4. The flowpath ring 16 (as opposed to forming a joint between each of the plurality of turbine blades 14 and the hub 12 directly) allows for inspection of the blade joint 48 using non-destructive inspection methods.

An inspection tool 30 is used in step 306 to assess the quality of each blade joint 48. The inspection tool 30 allows for non-destructive testing of each blade joint 48 and for detection of cracks, inclusions, and other flaws that may be unlikely to be detected in other ways.

In some embodiments, the inspection tool 30 is an ultrasonic transducer. In such an embodiment, ultrasonic waves may be transmitted through each blade joint 48 to determine if there are any discontinuities or flaws in the blade joints 48. In some embodiments, the inspection tool 30 may be a magnification device. In such an embodiment, a surface quality of each blade joint 48 is inspected to determine if there are gaps, unevenness, cracks, holes, or other external defects. In some embodiments, the inspection tool 30 may be an eddy current sensor. In such an embodiment, a magnetic field is induced and current flow disruption may reveal the presence of flaws in each blade joint 48. In some embodiments, the inspection tool 30 may be a flash thermography device. In such an embodiment, the surface of each blade joint 48 is heated by a light pulse. In some embodiments, the inspection tool 30 may be a combination of tools. The inspection of each blade joint 48 allows for the fixing or discarding of any defective blade joints 48.

The ring assembly 15 is attached to a mount tool 36 in step 308 as shown in FIGS. 3 and 4. The mount tool 36 holds the ring assembly 15 in a stationary position. In some embodiments, a radially-inwardly facing surface 42 of the flowpath ring 16 (i.e., the ring assembly 15) and a radially-outwardly facing surface 28 of the hub 12 may be machined to have matching conical surfaces.

Figure 5:
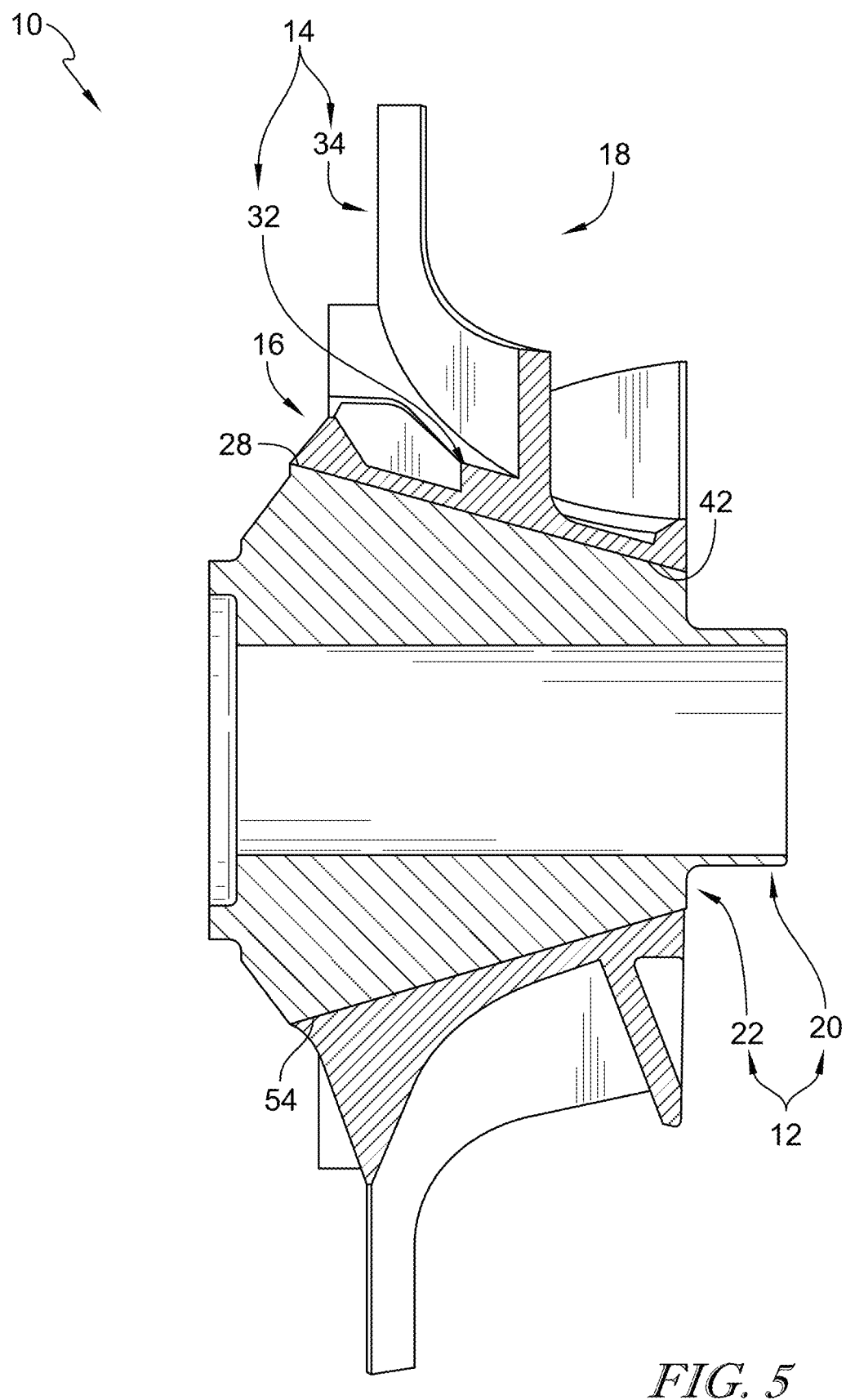
FIG. 5 is a sectional view of the radial turbine rotor FIG. 1 showing a contour of a radially-inwardly facing surface of the ring assembly matches a contour of a radially-outwardly facing surface of the hub, and further showing the friction weld joint between the radially-inwardly facing surface of the ring assembly and the radially-outwardly facing surface of the hub.

In step 310, the hub 12 is fixed to the ring assembly 15 by a hub joint 54 as shown in FIGS. 3 and 5. In some embodiments, the hub joint 54 is a diffusion bond joint. In the illustrative embodiment, the hub joint 54 is a friction weld joint. In some embodiments, the friction weld is a rotary friction weld (i.e., an inertia weld). Inertia welding is a solid-state joining process that may not require the use of shielding gases, fluxes, or other materials to join the hub 12 and the ring assembly 15.

The step 310 of friction welding includes step 312 of spinning the hub 12 about the central axis 11. The hub 12 may be attached to a spindle for rotation therewith.

As the hub 12 is spinning about the central axis 11, the hub 12, in step 314, is moved axially into engagement with the ring assembly 15 using a high axial force. The mount tool 36 holds the ring assembly 15 in a stationary position and counteracts axial and circumferential forces generated by the spinning and axial moving of the hub 12. The hub 12 is forced into the ring assembly 15 such that the hub 12 is located radially inward of the ring assembly 15. The contour of the radially-outwardly facing surface 28 of the conical portion 22 of the hub 12 matches the contour of the radially-inwardly facing surface 42 of the ring assembly 15 so that the hub 12 and the flowpath ring 16 may be friction welded. Heat is generated between the radially-outwardly facing surface 28 of the hub 12 and the radially-inwardly facing surface 42 of the ring assembly 15 as the surfaces 28, 42 rub against one another at high speed and pressure. The interaction between the two surfaces 28, 42 results in mechanical friction, which allows the two surfaces 28, 42 to create the hub joint 54 at the interface.

After the hub joint 54 is formed, the radial turbine rotor 10 is inspected in step 316 as shown in FIGS. 3 and 4. The radial turbine rotor 10 is inspected in step 316 to determine if the hub joint 54 has been sufficiently formed between the hub 12 and the ring assembly 15. An inspection tool 31 is used in step 316 to assess the quality the hub joint 54. The inspection tool 31 may be the same as the inspection tool 30. The inspection tool 31 allows for non-destructive testing of the hub joint 54 and for detection of cracks, inclusions, and other flaws that may be unlikely to be detected in other ways.

In some embodiments, the inspection tool 31 is an ultrasonic transducer. In such an embodiment, ultrasonic waves may be transmitted through the hub joint 54 to determine if there are any discontinuities or flaws in the hub joint 54. In some embodiments, the inspection tool 31 may be a magnification device. In such an embodiment, a surface quality of the hub joint 54 is inspected to determine if there are gaps, unevenness, cracks, holes, or other external defects. In some embodiments, the inspection tool 31 may be an eddy current sensor. In such an embodiment, a magnetic field is induced and current flow disruption may reveal the presence of flaws in the hub joint 54. In some embodiments, the inspection tool 31 may be a flash thermography device. In such an embodiment, the surface of the hub joint 54 is heated by a light pulse. The inspection of the hub joint 54 allows for the fixing of any defective portions of the hub joint 54.

As assembled, the hub 12 defines a radially-innermost surface of the radial turbine rotor 10. The root portion 32 of each of the plurality of turbine blades 14 is adjacent the hub 12, and the airfoil portion 34 of each of the plurality of turbine blades 14 extends radially outward into the gas path 18. The flowpath ring 16 is located radially between the hub 12 and the plurality of turbine blades 14.

In some embodiments, the hub 12 and the flowpath ring 16 comprise the same material so that a homogeneous hub joint 54 is formed. In some embodiments, the hub 12 and the flowpath ring 16 comprise different materials. For example, the flowpath ring 16 may comprise an alloy that is oxidation resistant with a relatively low strength, and the hub 12 may comprise an alloy that is not as oxidation resistant as the alloy of the flowpath ring 16 with a relatively high strength and relatively high temperature capability. Because the hub 12 is not exposed to the gas path 18, the material comprising the hub 12 need not be as oxidation resistant as the material comprising the flowpath ring 16.

In some embodiments, each of the plurality of turbine blades 14 is cooled. In such an embodiment, each of the turbine blades 14 are formed to include a cooling air passageway 40 extending therethrough to cool the turbine blades 14 that are exposed to the hot working fluid flowing through the gas path 18. Cooling air is supplied to each of the turbine blades 14 from a location radially inward of each of the turbine blades 14. Cooling air travels radially outward from the hub 12 into the cooling air passageway 40 of each of the turbine blades 14. In some embodiments, at least one of the plurality of turbine blades 14 is cooled.

In some embodiments, the hub 12 comprises nickel superalloy, such as, but not limited to, Udimet 720. In some embodiments, the hub 12 comprises nickel powder alloy, such as, but not limited to, RR1000. In some embodiments, the hub 12 comprises polycrystalline nickel-based superalloy, such as, but not limited to, Mar-M-247. In some embodiments, the flowpath ring 16 comprises nickel superalloy, such as, but not limited to, Udimet 720. In some embodiments, the flowpath ring 16 comprises nickel powder alloy, such as, but not limited to, RR1000. In some embodiments, the flowpath ring 16 may be made through additive manufacturing and may comprise a high temperature alloy. In some embodiments, the flowpath ring 16 comprises polycrystalline nickel-based superalloy, such as, but not limited to, Mar-M-247

In some embodiments, each of the plurality of turbine blades 14 comprises metallic materials. For example, each of the plurality of turbine blades 14 may comprise polycrystalline nickel-based superalloy, such as, but not limited to, Mar-M-247. In some examples, each of the plurality of turbine blades 14 may comprise directionally solidified alloys, such as, but not limited to, CM186LC. In some examples, each of the plurality of turbine blades 14 may comprise single crystal alloys, such as, but not limited to CMSX-3 or CMSX-4. In some embodiments, each of the plurality of turbine blades 14 may be formed through additive manufacturing and may comprise, for example, Haynes 282 alloy. In some embodiments, each of the plurality of turbine blades 14 may be made through additive manufacturing and may comprise a high temperature alloy. In some examples, each of the plurality of turbine blades 14 may be formed through metal injection molding and may comprise Mar-M-247. In the illustrative embodiment, each of the plurality of turbine blades 14 is integrally formed as a single component. In some embodiments, each of the plurality of turbine blades 14 may be a hybrid bonded turbine blade 14 composed of one or more alloys or materials. For example, each of the plurality of turbine blades 14 may comprise equiaxed outer portions bonded to a single crystal inner portion.

Figure 6:
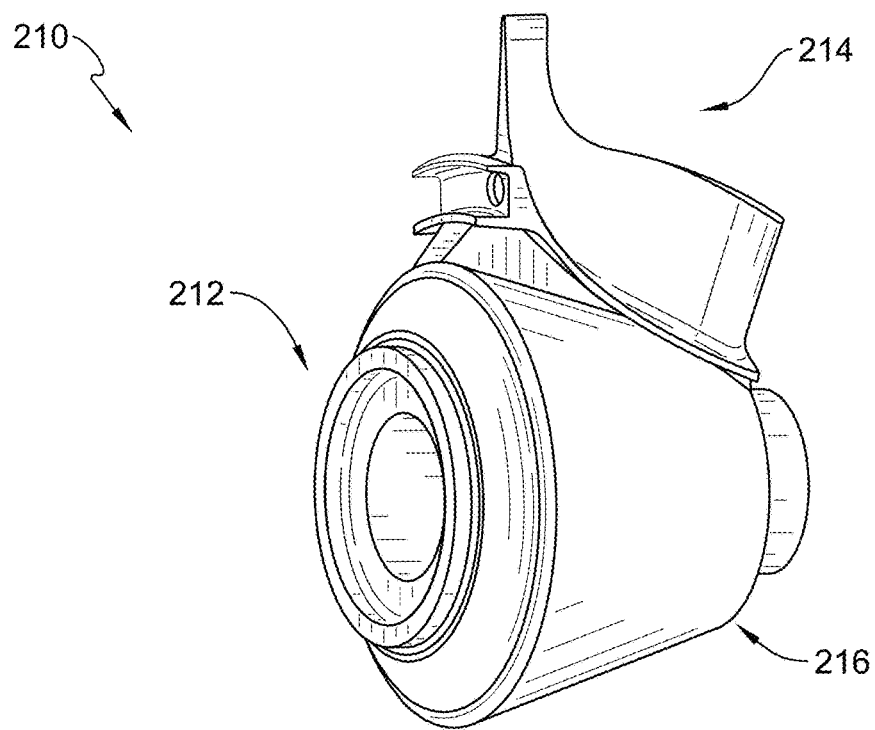
FIG. 6 is a perspective view of another radial turbine rotor assembled from a number of different pieces.
Figure 7:
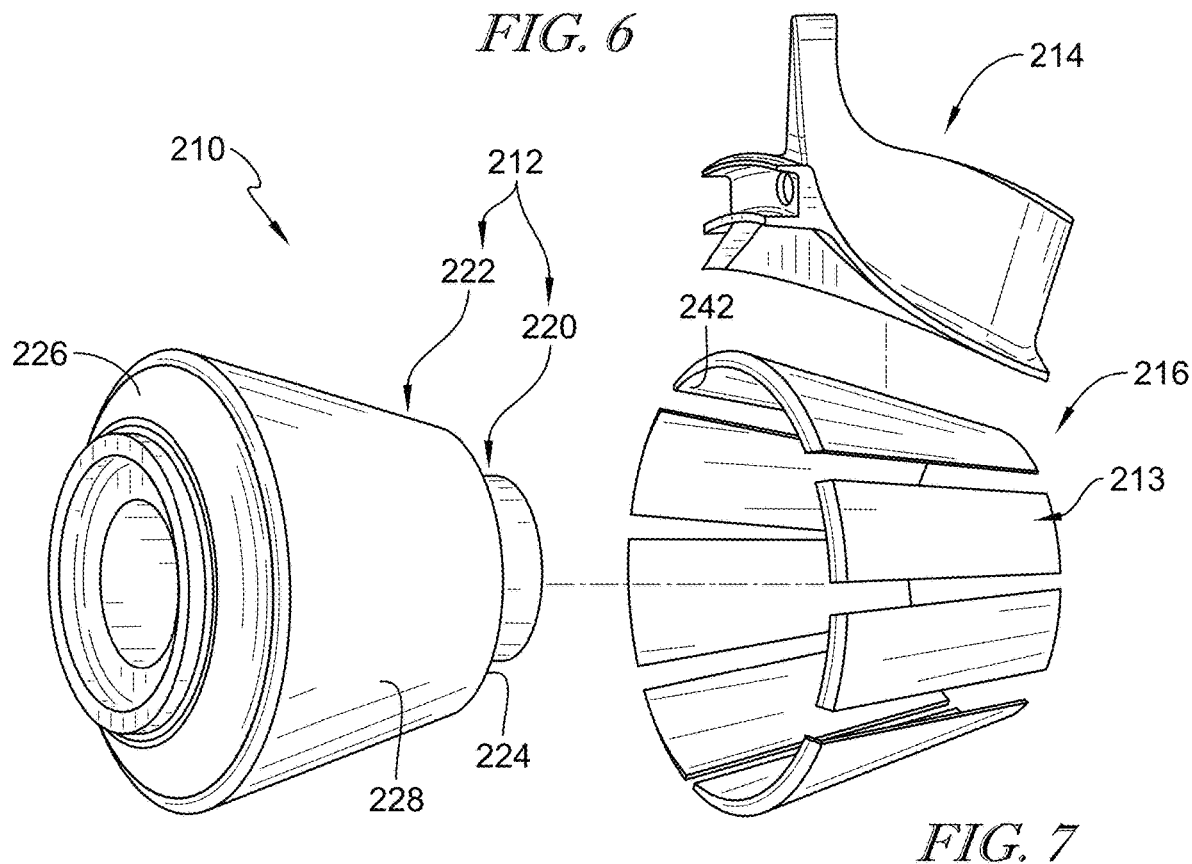
FIG. 7 is an exploded perspective assembly view of the radial turbine rotor of FIG. 6 showing the radial turbine rotor includes a hub, a turbine blade, and a flowpath ring, and further showing the flowpath ring formed of segments that extend circumferentially around the hub.
Figure 8:
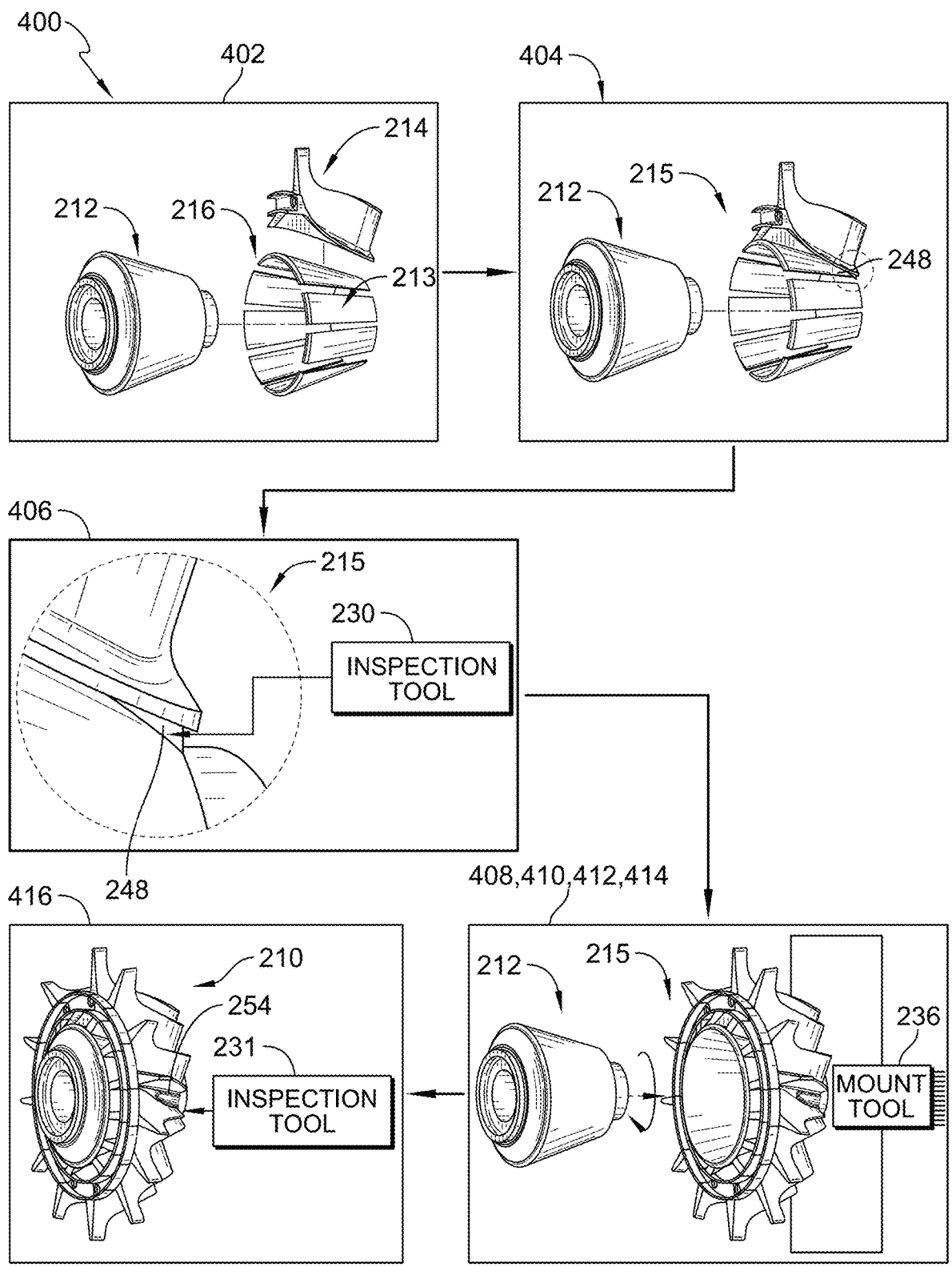
FIG. 8 is a diagrammatic view of another radial turbine rotor assembly process showing that the radial turbine rotor assembly process includes (i) manufacturing the hub, the turbine blade, and the flowpath ring, (ii) bonding the turbine blade with a segment of the flowpath ring to form a segmented ring assembly, (iii) inspecting a blade joint between the turbine blade and the segment of the flowpath ring, (iv) attaching the segmented ring assembly to a mount tool, rotating the hub, and axially moving the hub into engagement with the segmented ring assembly to form the radial turbine rotor, and (v) inspecting a friction weld joint between the hub and the segmented ring assembly.

Another embodiment of a radial turbine rotor 210 in accordance with the present disclosure is shown in FIGS. 6-8. The radial turbine rotor 210 is substantially similar to the radial turbine rotor 10 shown in FIGS. 2-5 and described herein. Accordingly, similar reference numbers in the 200 series indicate features that are common between the radial turbine rotor 10 and the radial turbine rotor 210. The description of the radial turbine rotor 10 is incorporated by reference to apply to the radial turbine rotor 210, except in instances when it conflicts with the specific description and the drawings of the radial turbine rotor 210.

The radial turbine rotor 210 includes the hub 212, the plurality of turbine blades 214, and the flowpath ring 216, which are separate components that are assembled to form the radial turbine rotor 210 as suggested in FIG. 7. The multi-piece radial turbine rotor 210 allows for inspection of each component prior to assembly of the radial turbine rotor 210 so that the entire radial turbine rotor 210 may not be deemed unusable due to a defect in one component.

Figure 6A:
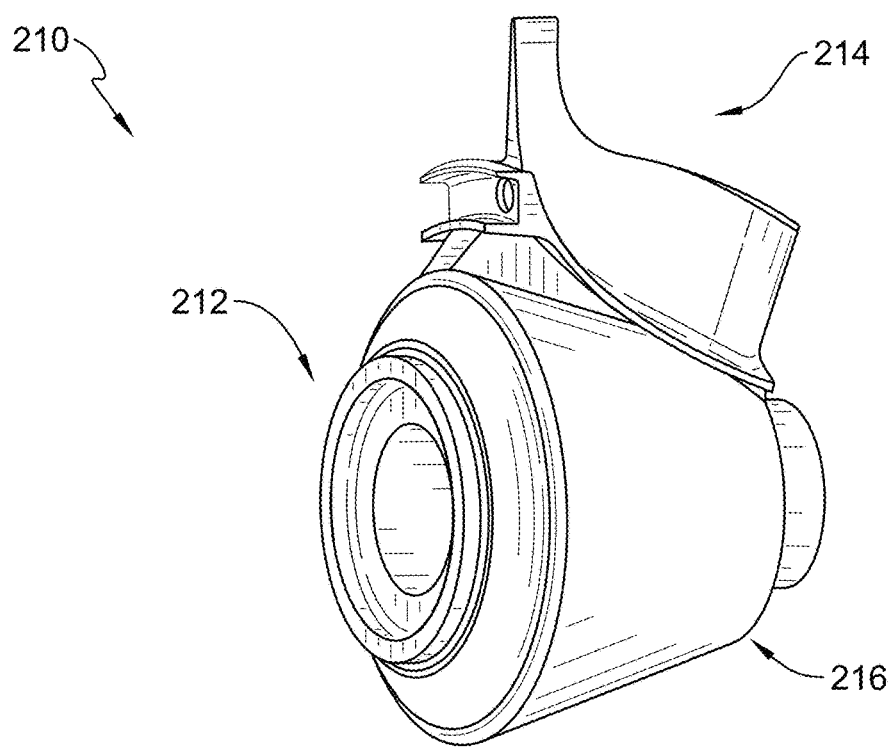
FIG. 6A is a perspective view of the radial turbine rotor of FIG. 6 with the flowpath ring formed as a single integral component.
Figure 7A:
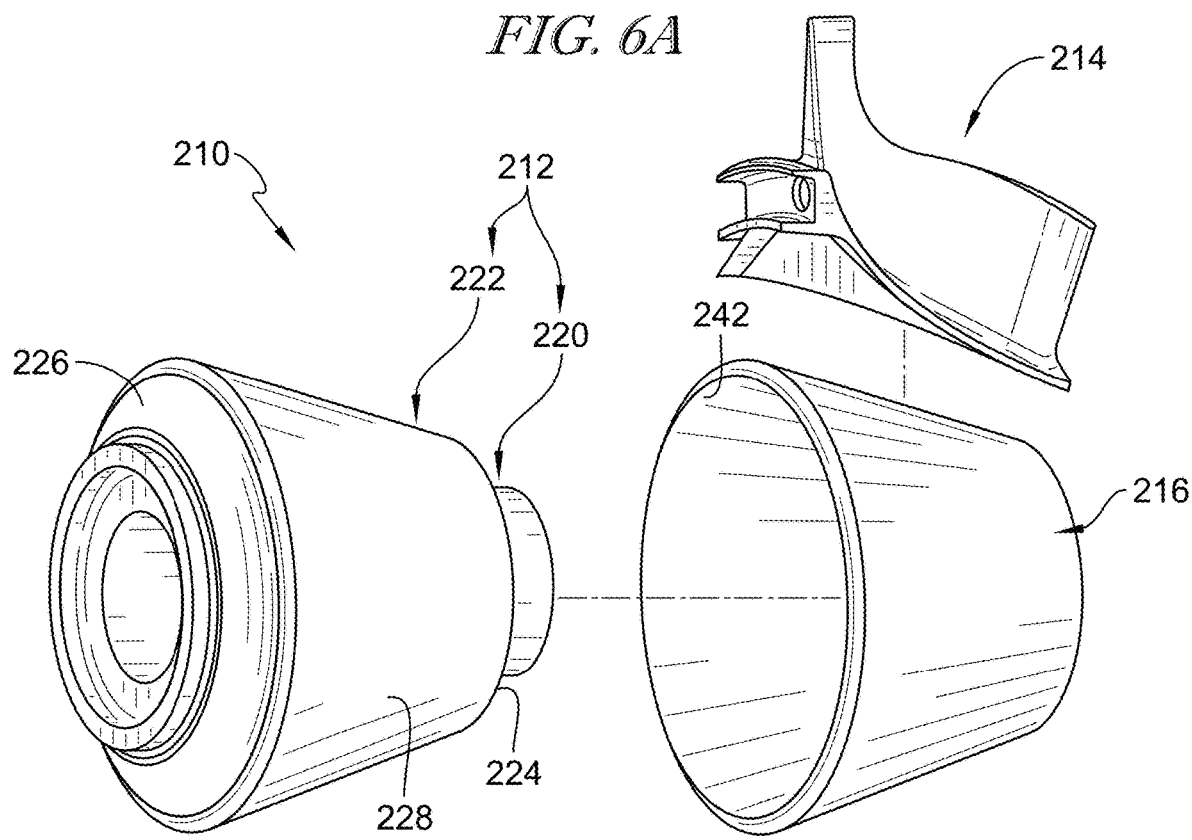
FIG. 7A is an exploded perspective assembly view of the radial turbine rotor of FIG. 6A showing the radial turbine rotor includes the hub, the turbine blade, and the flowpath ring formed as a single integral component that extends circumferentially around the hub.

A radial turbine rotor assembly process 400 for assembling the radial turbine rotor 210 is shown in FIG. 8. In step 402, the hub 212, the plurality of turbine blades 214, and the flowpath ring 216 are separately manufactured. In the illustrative embodiment, the hub 212 is integrally formed as a single component. In some embodiments, the flowpath ring 216 is formed as a plurality of segments 213 that circumferentially form the flowpath ring 216 as shown in FIG. 7. In some embodiments, the flowpath ring 216 is integrally formed as a single component as shown in FIGS. 6A and 7A and described in further detail below.

Each component (i.e., the hub 212, each of the plurality of turbine blades 214, and each of the plurality of segments 213 of the flowpath ring 216) are inspected for defects. Components including a defect may be discarded such that the component is not used in the process 400.

In the illustrative embodiment, the hub 212 includes a cylindrical portion 220 and a conical portion 222. The conical portion 222 of the hub 212 extends between a first end 224 and a second end 226. The first end 224 has a first diameter, and the second end 226 has a second diameter. The first diameter is smaller than the second diameter. The first end 224 of the conical portion 222 is coupled with the cylindrical portion 220 of the hub 212.

Each of the plurality of turbine blades 214 is coupled with a corresponding one of the plurality of segments 213 of the flowpath ring 216 in step 404 to form a plurality of ring assemblies 215 as shown in FIG. 8. Each turbine blade 214 is fixed to one of the plurality of segments 213 of the flowpath ring 216 by a blade joint 248. In some embodiments, the blade joint 248 is a braze joint. In some embodiments, the blade joint 248 is a diffusion bond joint. In some embodiments, the blade joint 248 is a friction weld joint, such as a linear friction weld joint. In some embodiments, the blade joint 248 may be any other joint that fixes the turbine blade 214 with the flowpath ring 216.

The plurality of ring assemblies 215 is inspected in step 406 to determine if each blade joint 248 has been sufficiently formed as shown in FIG. 8. An inspection tool 230 is used in step 406 to assess the quality of each of the blade joints 248. The inspection tool 230 allows for non-destructive testing of the blade joints 248 and for detection of cracks, inclusions, and other flaws that may be unlikely to be detected in other ways.

In some embodiments, the inspection tool 230 is an ultrasonic transducer. In such an embodiment, ultrasonic waves may be transmitted through each of the blade joints 248 to determine if there are any discontinuities or flaws in the blade joints 248. In some embodiments, the inspection tool 230 may be a magnification device. In such an embodiment, a surface quality of each of the blade joints 248 is inspected to determine if there are gaps, unevenness, cracks, holes, or other external defects. In some embodiments, the inspection tool 230 may be an eddy current sensor. In such an embodiment, a magnetic field is induced and current flow disruption may reveal the presence of flaws in the blade joints 248. In some embodiments, the inspection tool 230 may be a flash thermography device. In such an embodiment, the surface of each of the blade joints 248 is heated by a light pulse. In some embodiments, the inspection tool 230 may include a combination of tools. The inspection of each blade joint 248 allows for the fixing or discarding of any defective blade joints 248.

The plurality of ring assemblies 215 is attached to a mount tool 236 in step 408 as shown in FIG. 8. In the illustrative embodiment, because the plurality of ring assemblies 215 comprises separate components, the mount tool 236 attaches to each of the plurality of ring assemblies 215. The mount tool 236 holds the plurality of ring assemblies 215 circumferentially together in a stationary position. In some embodiments, a radially-inwardly facing surface 242 of the plurality of ring assemblies 215 and a radially-outwardly facing surface 228 of the hub 212 may be machined to have matching conical surfaces.

In step 410, the hub 212 is fixed to the flowpath ring 216 by a hub joint 254 as shown in FIG. 8. In some embodiments, the hub joint 254 is a diffusion bond joint. In some embodiments, the hub joint 254 is a friction weld joint, such as a rotary friction weld or a linear friction weld. In the illustrative embodiment, the friction weld is a rotary friction weld (i.e., an inertia weld). The step 410 of friction welding includes step 412 of spinning the hub 212 about an axis. The hub 212 may be attached to a spindle for rotation therewith.

As the hub 212 is spinning about the axis, the hub 212, in step 414, is moved axially into engagement with the plurality of ring assemblies 215 using a high axial force. The mount tool 236 holds the plurality of ring assemblies 215 in a stationary positions and counteracts the axial and circumferential forces generated by the spinning and axial moving hub 212. The hub 212 is forced into the plurality of ring assemblies 215 such that hub 212 is located radially inward of the plurality of ring assemblies 215. The contour of the radially-outwardly facing surface 228 of the conical portion 222 of the hub 212 matches the contour of the radially-inwardly facing surface 242 of the plurality of ring assemblies 215 so that the hub 212 and the plurality of ring assemblies 215 may be friction welded. Heat is generated between the radially-outwardly facing surface 228 of the hub 212 and the radially-inwardly facing surface 242 of the plurality of ring assemblies 215 as the surfaces 228, 242 rub against one another at high speed and pressure. The interaction between the two surfaces 228, 242 results in mechanical friction, which allows the two surfaces 228, 242 to create the hub joint 254 at the interface.

After the hub joint 254 is formed, the radial turbine rotor 210 is inspected in step 416 as shown in FIG. 8. The radial turbine rotor 210 is inspected in step 416 to determine if the hub joint 254 has been sufficiently formed between the hub 212 and the plurality of ring assemblies 215. An inspection tool 231 is used in step 416 to assess the quality of the hub joint 254. The inspection tool 231 may be the same as the inspection tool 230. The inspection tool 231 allows for non-destructive testing of the hub joint 254 and for detection of cracks, inclusions, and other flaws that may be unlikely to be detected in other ways.

In some embodiments, the inspection tool 231 is an ultrasonic transducer. In some embodiments, the inspection tool 231 may be a magnification device. In some embodiments, the inspection tool 231 may be an eddy current sensor. In some embodiments, the inspection tool 231 may be a flash thermography device. The inspection of the hub joint 254 allows for the fixing of any defective portions of the hub joint 254.

In some embodiments, the friction weld of the hub joint 254 is a linear friction weld. In such an embodiment, the hub 212 oscillates at a high speed with high compressive forces in relation to the plurality of ring assemblies 215. The resulting heat generated at the interface between the radially-outwardly facing surface 228 of the hub 212 and the radially-inwardly facing surface 242 of the plurality of ring assemblies 215 results in the linear friction weld.

In the embodiments of the radial turbine rotor 210 shown in FIGS. 6A and 7A, the radial turbine rotor 210 includes the flowpath ring 216 formed as a single integral component. For example, in step 402, the flowpath ring 216 is integrally formed as a single annular component. In such an embodiment, each of the plurality of turbine blades 214 is coupled with the flowpath ring 216 by the blade joint 248 in step 404 to form a single ring assembly 215. In the illustrative embodiment, the blade joint 248 is a linear friction weld joint.

In step 406, the single ring assembly 215 is inspected to determine if each blade joint 248 has been sufficiently formed. In step 408, the single ring assembly 215 is attached to the mount tool 236. In step 410, the hub 212 is fixed to the single ring assembly 215 by the hub joint 254. After the hub joint 254 is formed, the radial turbine rotor 210 is inspected to determine if the hub joint 254 has been sufficiently formed between the hub 212 and the single ring assembly 215.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A radial turbine rotor, the rotor comprising:
   a hub arranged around a central axis that defines a radially-innermost surface of the rotor,
   a plurality of turbine blades located circumferentially outward of the hub, and
   a flowpath ring coupled with each of the plurality of turbine blades and the hub to locate the flowpath ring radially between the hub and each of the plurality of turbine blades, the flowpath ring formed to include a plurality of apertures spaced apart from one another about the flowpath ring and extending radially through the flowpath ring, each of the plurality of apertures receiving a corresponding one of the plurality of turbine blades therein,
   wherein the hub is fixed to the flowpath ring by a friction weld joint formed between a radially-outwardly facing surface of the hub and a radially-inwardly facing surface of the flowpath ring,
   wherein each of the plurality of turbine blades is fixed to the flowpath ring by a blade joint formed between each of the plurality of turbine blades and the flowpath ring.

2. The radial turbine rotor of claim 1, wherein the friction weld joint is an inertia weld joint.

3. The radial turbine rotor of claim 1, wherein the blade joint is a braze joint.

4. The radial turbine rotor of claim 3, wherein the flowpath ring is a full hoop.

5. The radial turbine rotor of claim 1, wherein the friction weld joint is a linear friction weld joint.

6. The radial turbine rotor of claim 1, wherein the radially-inwardly facing surface of the flowpath ring and the radially-outwardly facing surface of the hub are matching conical surfaces.

7. The radial turbine rotor of claim 1, wherein each of the plurality of apertures is sized to receive a root portion of the corresponding one of the plurality of turbine blades.

8. The radial turbine rotor of claim 7, wherein an airfoil portion of each of the plurality of turbine blades is located radially outward of the flowpath ring.

9. The radial turbine rotor of claim 1, wherein each of the plurality of apertures is sized to block radially outward movement of the corresponding one of the plurality of turbine blades out of the respective aperture of the plurality of apertures.

10. The radial turbine rotor of claim 1, wherein the hub and the flowpath ring are each formed of the same materials.

11. A radial turbine rotor, the rotor comprising:
    a hub arranged around a central axis that defines a radially-innermost surface of the rotor,
    a plurality of turbine blades located circumferentially outward of the hub, each of the plurality of turbine blades shaped to include a root portion and an airfoil portion radially outward of the root portion, and
    a flowpath ring coupled with each of the plurality of turbine blades and the hub to locate the flowpath ring radially between the hub and each of the plurality of turbine blades, the flowpath ring formed to include a plurality of apertures extending radially through the flowpath ring, wherein each of the plurality of turbine blades is located in a corresponding one of the plurality of apertures of the flowpath ring such that the root portion of each of the plurality of turbine blades is within the corresponding one of the plurality of apertures,
- wherein the hub is fixed to the flowpath ring by a friction weld joint formed between a radially-outwardly facing surface of the hub and a radially-inwardly facing surface of the flowpath ring,
- wherein each of the plurality of turbine blades is fixed circumferentially around the flowpath ring by a blade joint formed between the root portion of each of the plurality of turbine blades and surfaces of the corresponding one of the plurality of apertures of the flowpath ring.

12. The radial turbine rotor of claim 11, wherein each of the plurality of apertures includes a first circumferentially-facing surface and a second circumferentially-facing surface spaced apart from the first circumferentially-facing surface, and wherein the blade joint is formed at least between the root portion of each of the plurality of turbine blades located in the corresponding one of the plurality of apertures and the first circumferentially-facing surface and the second circumferentially-facing surface of the corresponding one of the plurality of apertures.

13. The radial turbine rotor of claim 11, wherein the friction weld joint is an inertia weld joint.

14. The radial turbine rotor of claim 11, wherein the blade joint is a braze joint.

15. The radial turbine rotor of claim 11, wherein the flowpath ring is a full hoop.

16. The radial turbine rotor of claim 11, wherein the friction weld joint is a linear friction weld joint.

17. The radial turbine rotor of claim 11, wherein the radially-inwardly facing surface of the flowpath ring and the radially-outwardly facing surface of the hub are matching conical surfaces.

18. The radial turbine rotor of claim 11, wherein the airfoil portion of each of the plurality of turbine blades is located radially outward of the flowpath ring.

19. The radial turbine rotor of claim 11, wherein each of the plurality of apertures is sized to block radially outward movement of a corresponding one of the plurality of turbine blades out of the respective aperture of the plurality of apertures.

20. The radial turbine rotor of claim 11, wherein the hub and the flowpath ring are each formed of the same materials.

* * * * *